United States Patent
Barbieri et al.

(10) Patent No.: US 9,294,240 B2
(45) Date of Patent: Mar. 22, 2016

(54) MULTI-CARRIER OPERATIONS WITH FAST FREQUENCY HOPPING

(75) Inventors: Alan Barbieri, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 13/403,933

(22) Filed: Feb. 23, 2012

(65) Prior Publication Data

US 2012/0218954 A1 Aug. 30, 2012

Related U.S. Application Data

(60) Provisional application No. 61/446,940, filed on Feb. 25, 2011.

(51) Int. Cl.

| | |
|---|---|
| *H04W 4/00* | (2009.01) |
| *H04L 5/00* | (2006.01) |
| *H04W 72/04* | (2009.01) |
| *H04J 1/10* | (2006.01) |
| *H04J 3/08* | (2006.01) |
| *H04J 1/16* | (2006.01) |
| *H04J 3/14* | (2006.01) |
| *H04L 12/66* | (2006.01) |

(Continued)

(52) U.S. Cl.
CPC ............... *H04L 5/003* (2013.01); *H04W 4/00* (2013.01); *H04W 72/04* (2013.01)

(58) Field of Classification Search
CPC .......... H04L 5/001; H04L 1/18; H04W 24/10
USPC ............. 370/252, 328, 315, 352; 714/751
See application file for complete search history.

(56) References Cited

U.S. PATENT DOCUMENTS

| 8,000,272 B2 | 8/2011 | Gao et al. | |
|---|---|---|---|
| 2006/0209801 A1* | 9/2006 | Joshi et al. | 370/352 |
| 2010/0157875 A1* | 6/2010 | Li et al. | 370/315 |

(Continued)

FOREIGN PATENT DOCUMENTS

| CN | 101867953 A | 10/2010 |
|---|---|---|
| WO | WO2010078962 A1 | 7/2010 |

(Continued)

OTHER PUBLICATIONS

International Search Report and Written Opinion—PCT/US2012/026498—ISA/EPO—May 18, 2012.

(Continued)

*Primary Examiner* — Tuan C. To
*Assistant Examiner* — Mahmoud Ismail
(74) *Attorney, Agent, or Firm* — Norton Rose Fulbright US LLP

(57) ABSTRACT

A method of wireless communication includes receiving by a single RF receiver of a user equipment (UE) a first portion of a downlink transmission from an eNode B (eNodeB) on a downlink primary carrier during at least one periodic subframe of the downlink primary carrier. The method also includes receiving by the single RF receiver a second portion of the downlink transmission from the eNodeB on the secondary downlink carrier. The reception occurs during a periodic sequence of subframes of the secondary downlink carrier following the at least one periodic subframe of the downlink primary carrier and before a second periodic subframe of the downlink primary carrier.

18 Claims, 14 Drawing Sheets

(51) Int. Cl.
   *H04L 1/00*    (2006.01)
   *H04L 12/26*   (2006.01)

(56) References Cited

U.S. PATENT DOCUMENTS

| | | | |
|---|---|---|---|
| 2010/0271970 A1* | 10/2010 | Pan et al. | 370/252 |
| 2010/0302983 A1  | 12/2010 | McBath et al. | |
| 2010/0303011 A1* | 12/2010 | Pan et al. | 370/328 |
| 2011/0176435 A1* | 7/2011  | Khandekar et al. | 370/252 |
| 2011/0188443 A1  | 8/2011  | Bahceci et al. | |
| 2011/0194501 A1* | 8/2011  | Chung et al. | 370/328 |
| 2011/0239076 A1* | 9/2011  | Liu et al. | 714/751 |

FOREIGN PATENT DOCUMENTS

| | | |
|---|---|---|
| WO | WO2010088536 A1   | 8/2010 |
| WO | WO-2010149101 A1  | 12/2010 |
| WO | WO-2011014002 A2  | 2/2011 |

OTHER PUBLICATIONS

ITRI: "Discussion of DRX Scheduling in Carrier Aggregation", 3GPP Draft; R2-097037, 3rd Generation Partnership Project (3GPP), Mobile Competence Centre ; 650, Route Des Luciolesf-06921 Sophia-Antipolis Cedex ; France, no. Jeju; Nov. 9, 2009, XP050391401, [retrieved on Nov. 2, 2009].

ZTE: "Downlink control structure for LTE-A" 3GPP Draft; R1-090628 Downlink Control Structure for LTE-A, 3rd Generation Partnership Project (3GPP), Mobile Competence Centre ; 650, Route Des Lucioles ; F-06921 Sophia-Antipolis Cedex ; France, no. Athens, Greece; Feb. 3, 2009, XP050318509.

Iwamura, M., Carrier Aggregation Framework in 3gpp LTE-Advanced, IEEE Communications Magazine, Aug. 2010, pp. 60-67, IEEE, New Jersey, US.

Iwamura, M. et al. "Carrier Aggregation Framework in 3GPP LTE-Advanced," IEEE Communications Magazine, Aug. 2010, pp. 60-67, Retrieved from the Internet at: http://ieeexplore.ieee.org/stamp/stamp.jsptv=&arnumber=5534588.

* cited by examiner

MULTI-CARRIER OPERATIONS WITH FAST FREQUENCY HOPPING

CROSS REFERENCE TO RELATED APPLICATION

The present application claims the benefit of U.S. provisional patent application No. 61/446,940 in the names of BARBIERI et al., filed on Feb. 25, 2011, the disclosure of which is expressly incorporated by reference herein in its entirety.

BACKGROUND

1. Field

Aspects of the present disclosure relate generally to wireless communication systems, and more particularly, to using carrier aggregation to enable communication on unreliable communication channels.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method of wireless communication includes receiving a first portion of a downlink transmission on a downlink primary carrier during at least one periodic subframe of the downlink primary carrier. The method also includes receiving a second portion of the downlink transmission on a secondary downlink carrier during a periodic sequence of subframes of the secondary downlink carrier following the at least one periodic subframe of the downlink primary carrier and before a second periodic subframe of the downlink primary carrier.

In another aspect of the present disclosure, an apparatus for wireless communication, includes a memory and at least one processor coupled to the memory. The processor(s) is configured to receive a first portion of a downlink transmission on a downlink primary carrier during at least one periodic subframe of the downlink primary carrier. The processor(s) is also configured to receive a second portion of the downlink transmission on a secondary downlink carrier during a periodic sequence of subframes of the secondary downlink carrier following the at least one periodic subframe of the downlink primary carrier and before a second periodic subframe of the downlink primary carrier.

In yet another aspect, a computer program product for wireless communications in a wireless network has a non-transitory computer-readable medium having program code recorded thereon. The program code includes program code to receive a first portion of a downlink transmission on a downlink primary carrier during at least one periodic subframe of the downlink primary carrier. The program code also includes program code to receive a second portion of the downlink transmission on a secondary downlink carrier during a periodic sequence of subframes of the secondary downlink carrier following the at least one periodic subframe of the downlink primary carrier and before a second periodic subframe of the downlink primary carrier.

In still another aspect, an apparatus for wireless communication has means for receiving a first portion of a downlink transmission on a downlink primary carrier during at least one periodic subframe of the downlink primary carrier. The apparatus also has means for receiving a second portion of the downlink transmission on a secondary downlink carrier during a periodic sequence of subframes of the secondary downlink carrier following the at least one periodic subframe of the downlink primary carrier and before a second periodic subframe of the downlink primary carrier.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
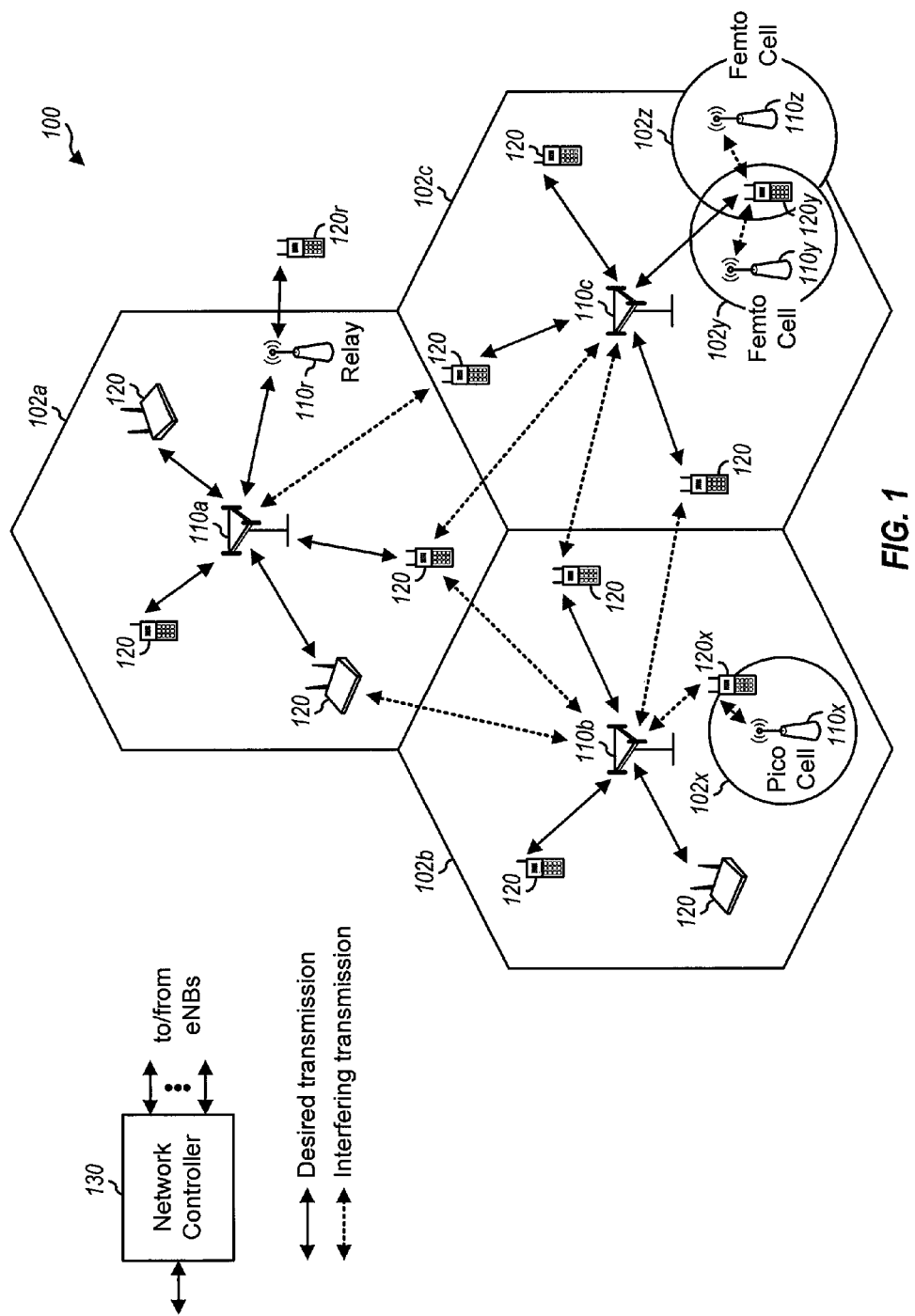
FIG. 1 is a block diagram conceptually illustrating an example of a telecommunications system.

FIG. 1 shows a wireless communication network 100, which may be an LTE-A network, with fast frequency hopping for multi-carrier operations. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
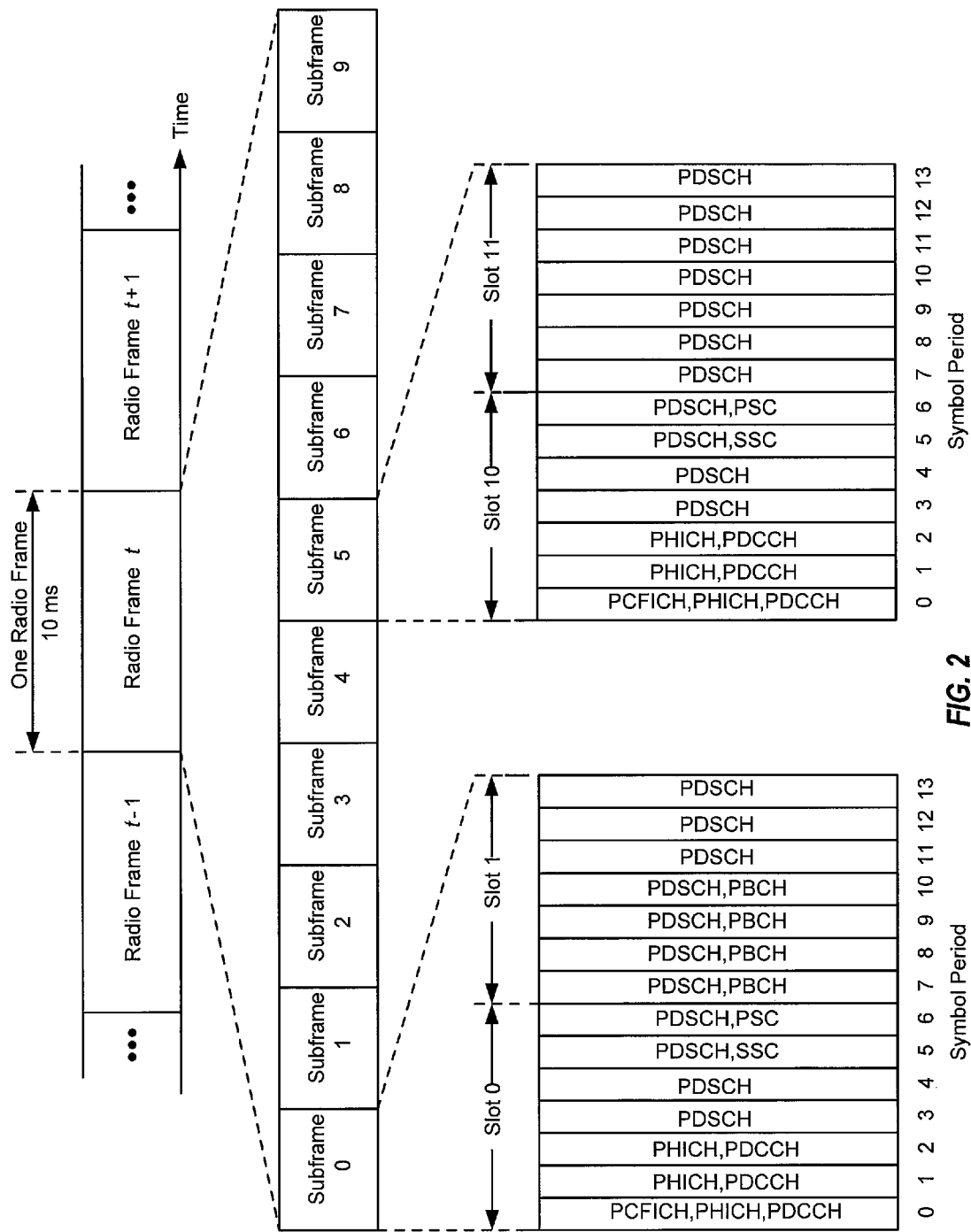
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
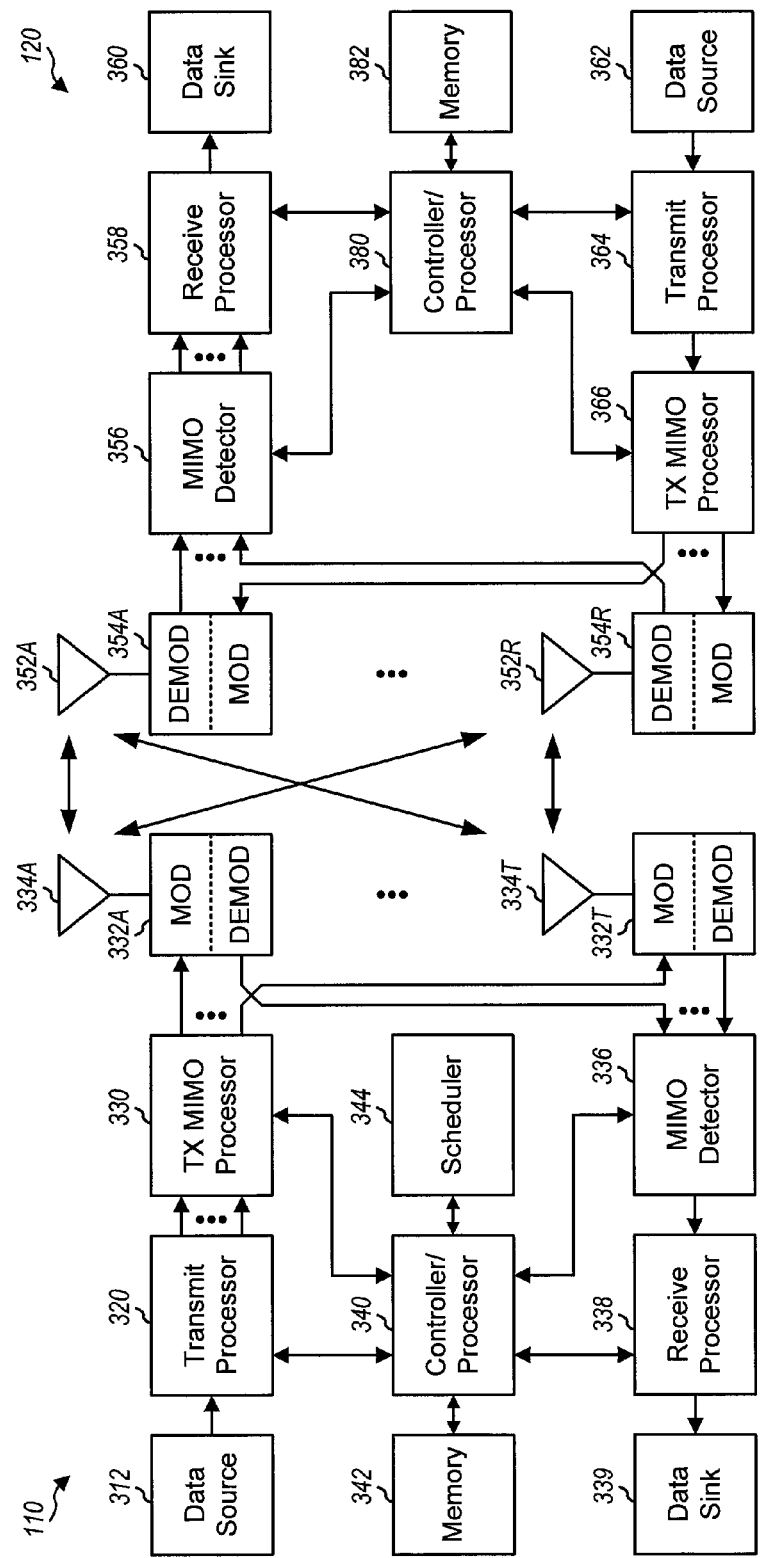
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

Carrier Aggregation

LTE-Advanced UEs use spectrum in up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
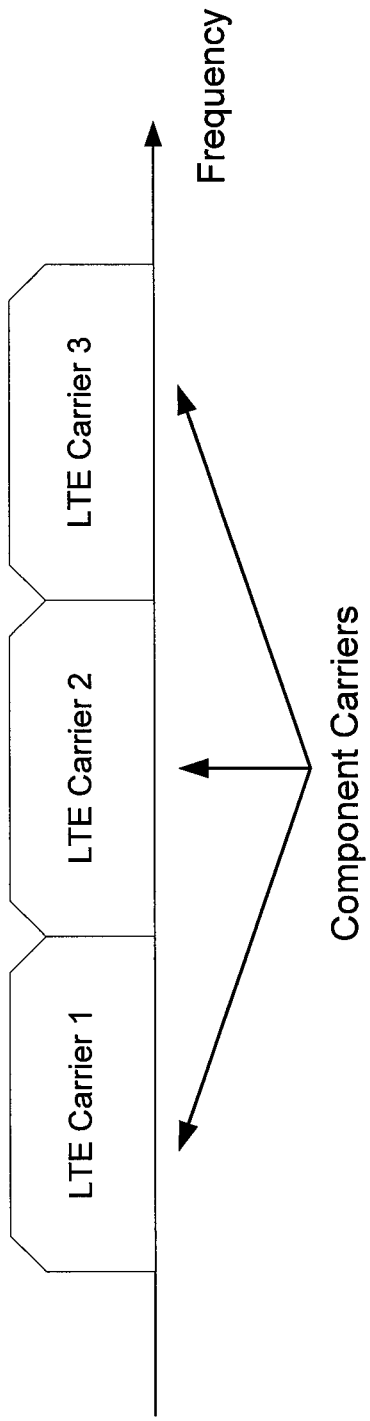
FIG. 4A discloses a continuous carrier aggregation type.
Figure 4B:
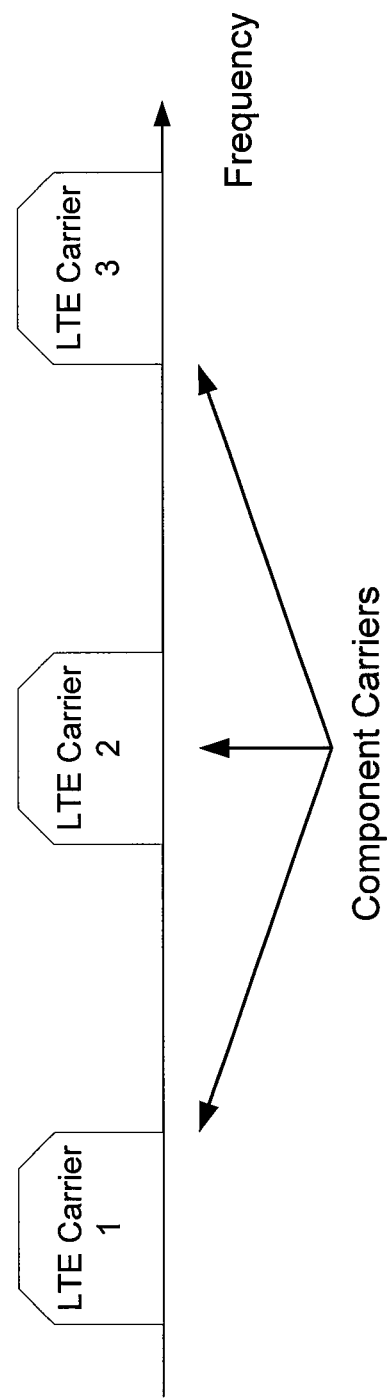
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
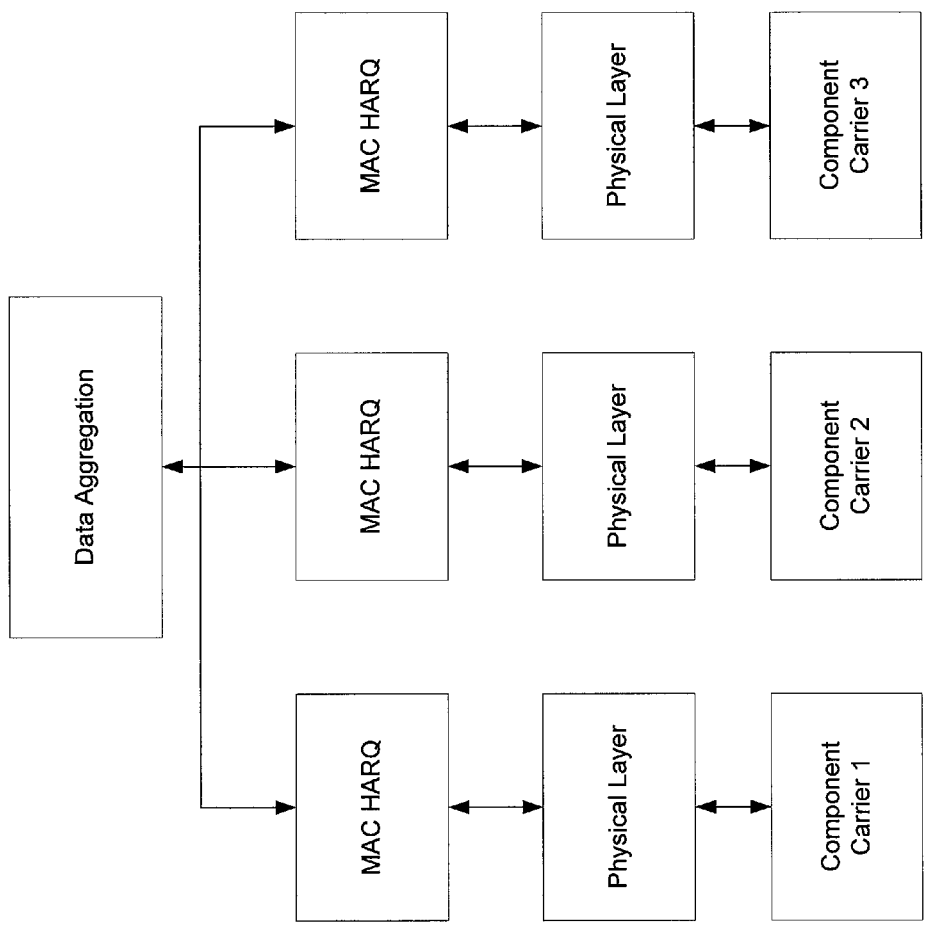
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (such as component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 6:
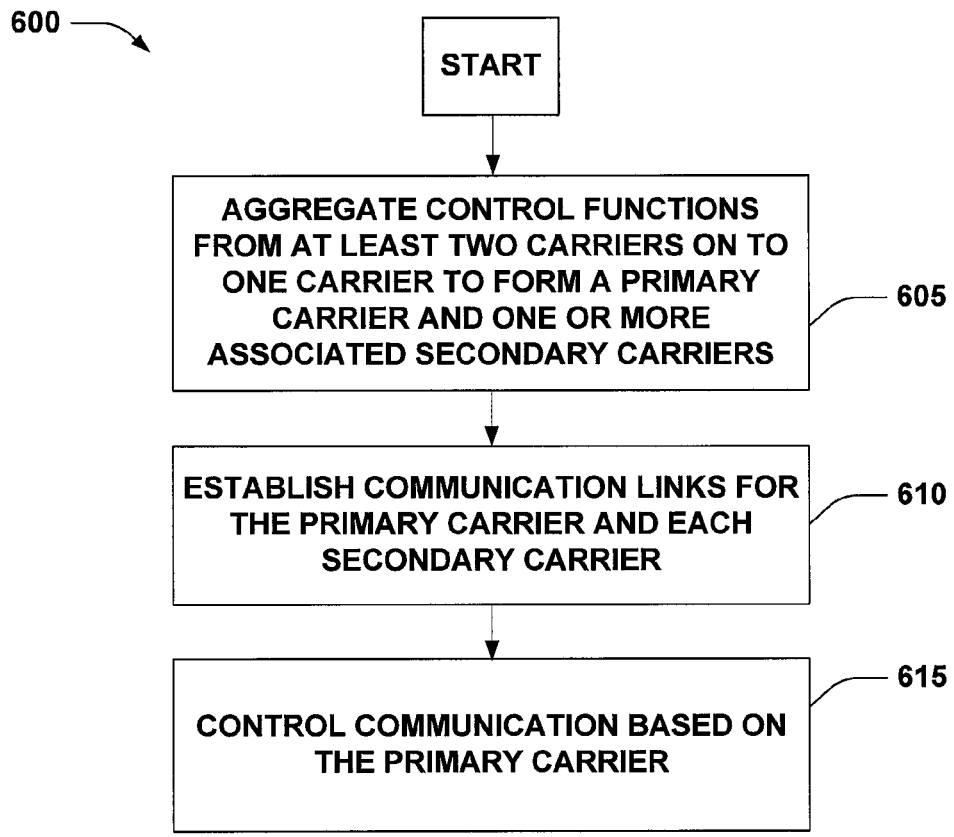
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

Certain available carriers may be partitioned by time division multiplexing (TDM) to provide nodes with at least one resource that is protected from dominant interference. This may involve coordination with potential interfering nodes to restrict transmission by the interferer on the protected resources. A protected resource may include one subframe out of a periodically repeating pattern of subframes on a particular carrier, denoted the "primary carrier" or "anchor carrier" for example. Transmissions on the protected resources are reliable because of the time domain partitioning.

Unprotected subframes on the primary carrier may be subject to interference. Other carriers that do not include protected resources, denoted as "unprotected secondary carriers," may also be subject to interference. Interference can be mitigated or avoided by allowing communication only over the protected resources or by avoiding the use of unprotected resources. It should be understood that even protected resources may be subject to some level of interference from nodes not involved in the coordinated resource protection scheme.

According to various aspects of the disclosure, the unprotected secondary carrier may be a secondary carrier of a carrier aggregation (CA) implementation, or may be a carrier within some unrelated or unlicensed spectrum, for example, white space. White space is a term used to refer to unused broadcast spectrum. Use of currently unused or unlicensed spectrum provides an advantage due to its lower cost when compared to licensed spectrum. For example, for transmission of both control and data, the licensed spectrum may be used for transmitting the control information with high reliability, while unlicensed spectrum may be used for transmitting data less reliably than the control information.

In some scenarios, the unprotected secondary carriers may also convey data to a UE, for example. The reliability of an unprotected secondary carrier generally depends on the strength of an interfering transmitter, the distance to the interfering transmitter, and loading of the unprotected secondary carrier.

Relying on an unprotected secondary carrier for conveying data to a UE may be problematic because the unprotected secondary carrier may be subject to sudden interference. Therefore, a UE that uses only an unprotected secondary carrier would be likely to declare radio link failures (RLFs) much more frequently than usual. The RLFs may cause the UE to remain out-of-service for a considerable time until the UE reselects a new carrier and performs reconnection.

Aggregation of the primary carrier and secondary carriers using carrier aggregation (CA) techniques can mitigate the risk of using secondary carriers to convey data to UEs having more than one RF receiver. In this scenario, one of the UE receivers may always be tuned on a primary carrier. Therefore, even if secondary carrier is lost due to interference, a connection may still be maintained. If CQI (channel quality indicator) reports (or some other type of measurement reports) indicate that the secondary carrier has acceptable quality, data transmission may be temporarily offloaded to the secondary carrier. However, due to cost, space and increased energy consumption of multiple receivers, many UEs employ only one RF receiver.

According to an aspect of the present disclosure, a UE that employs only one RF receiver may still operate on both a primary carrier and an unprotected secondary carrier by performing fast frequency hopping between the two carriers. The UE periodically returns to the primary carrier to maintain a reliable connection. According to this aspect of the disclosure, the eNodeB follows the same frequency hopping pattern as the UE to maintain the connection. The eNodeB may decide to offload data to secondary carriers, depending on reported channel conditions of the secondary carriers. This frequency hopping technique may also be used in the uplink communications in which the UE transmitter periodically switches between a primary and a secondary carrier.

Aspects of the present disclosure can be used in frequency division duplex (FDD) communications in which physical layer synchronization may be maintained on several carriers. Idle mode operations such as system information block 1 (SIB1) delivery, paging, and measurements may be performed on the primary carrier, which is time domain partitioned. Connected mode operations may be performed on two carriers, the primary carrier and an unprotected secondary carrier, through frequency hopping. In one example, the periodic changes between radio frequencies is performed in a short time, generally using only tens or hundreds of The periodic frequency changes may be implemented without substantially increasing energy consumption.

In one example, multicarrier operations are performed for downlink (DL) transmissions only and a single protected carrier is available for uplink (UL) transmissions. Most of transmissions to the UE are over an unprotected carrier and the UE periodically retunes to the primary carrier. The primary carrier can be used to communicate control information between a UE and an eNodeB or other transmitting node and to communicate whether the unprotected secondary carrier is still usable. It is envisioned that all or most of the data transmissions will be performed on the unprotected secondary carrier. If the unprotected secondary carrier becomes unusable, then a different unprotected secondary carrier can be designated in a grant to the UE or the primary carrier can be used for data transmission, without any offloading to a secondary carrier.

The UE receives a primary carrier downlink control information (DCI) grant and a secondary carrier DCI grant. Downlink control information provides necessary information that allows for proper receiving and decoding of downlink data transmissions by a UE. A downlink grant may carry control information for data transmission on the downlink. The primary carrier DCI grant is for the U subframe (protected subframe) on the primary carrier. The secondary carrier DCI grant is for particular subframes on the secondary carrier. The secondary carrier DCI grant may include bits indicating which carrier to use in cases where several carriers may be available. If a number (M) carriers are available, for example, as few as log 2(M) bits may be used to identify the secondary carrier. The DCI grant may also indicate a number of subframes affected by the grant. In this example, up to seven subframes may be affected depending on the downlink queue length.

Figure 7:
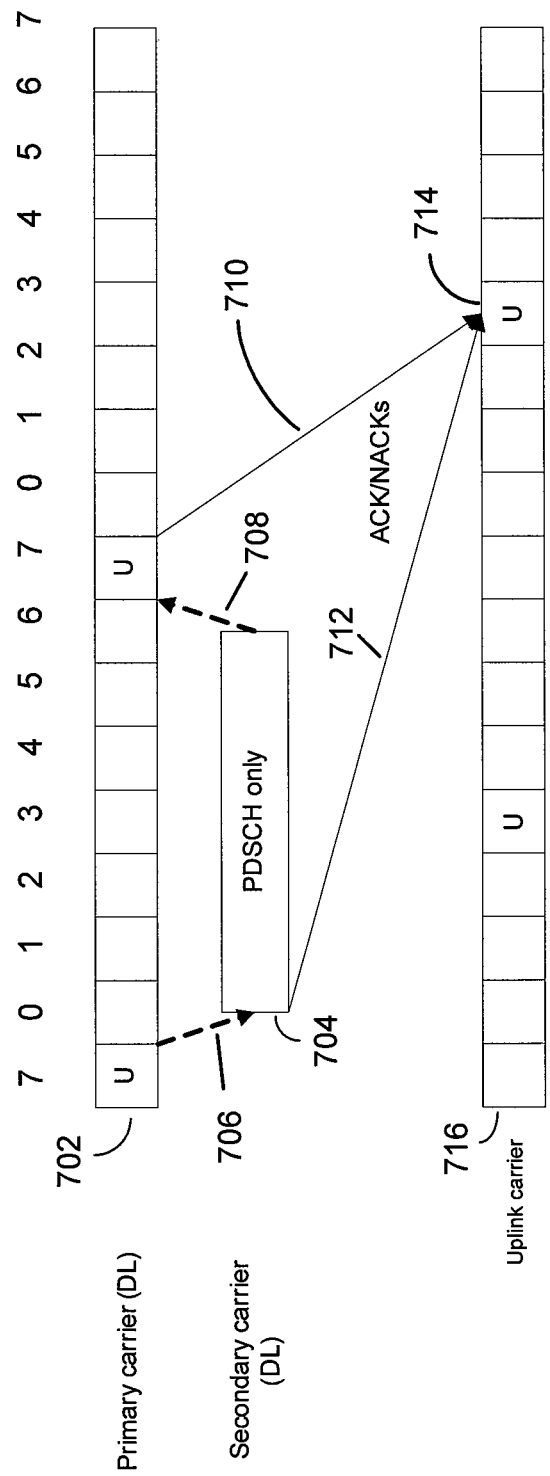
FIG. 7 is a diagram conceptually illustrating an example of a multicarrier frame structure according to an aspect of the disclosure.

Referring to FIG. 7, a diagram of a primary carrier for a downlink transmission is shown. The primary carrier is time division partitioned into subframes of about 1 millisecond each. The subframes are sequentially labeled with a pattern of numbers from 0 to 7 which periodically repeat. Although various examples are described in which the primary carrier is divided into a pattern of eight repeating subframes, it should be understood that virtually any number of repeating subframes could be used. In this example, the UE only uses one periodically repeating subframe, denoted the "U" subframe, on the primary carrier. The U subframe is protected from interference by coordination with potentially interfering transmitters, so it can be reliably transmit data to the UE. It should be apparent that capacity would be significantly reduced if all transmissions were restricted to the protected U subframes.

A diagram of an unprotected secondary carrier 704 is shown juxtaposed in time with the primary carrier 702. Again, it should be noted that a UE having a single receiver may not use the primary carrier 702 and the unprotected secondary carrier 704 at the same time.

During the U subframes, a UE receiver circuitry tunes to the primary carrier 702. The UE decodes the signal received on the protected "U" subframe. In this example, the downlink U subframe includes a few bits indicating the unprotected secondary carrier to use for the next subframes. The number of subframes and/or periods to which this carrier indication refers to may also be included in the U subframe, for example. As soon as the UE has decoded the U subframe, the UE retunes its receiver to the unprotected secondary carrier 704. The retuning takes some short time as shown by diagonal arrow 706 which is usually much less than the duration of a subframe. In this example, after retuning to the unprotected secondary carrier 704, the UE receives only the PDSCH data on the unprotected secondary carrier. Control signals such as PHICH, and PDCCH are received on the primary carrier 702.

During the finite time that elapses while the UE transceiver retunes, the subframes adjacent to a U subframe, denoted "transition subframes," are not completely available. This can be seen in FIG. 7 where the transition time represented by diagonal arrow 706 uses a portion of transition subframe 0, and the transition time represented by diagonal arrow 708 uses a portion of transition subframe 6, for example. Because the transition subframes are not entirely available for use on the secondary carrier, they may either be completely skipped or may be partially used. The transition subframes may be partially used by skipping only a few OFDM symbols at the beginning or at the end of the transition subframes, for example. In this case, symbols to be skipped should be known at both the eNodeB and the UE. This may be accomplished by puncturing some existing symbols, moving some existing symbols away from the transition subframes, or moving them away from the respective terminal ends of the transition subframes.

After a time corresponding to a number of subframes between U subframes has passed minus enough time to complete a retuning operation, the UE retunes to the primary carrier 702. The transition time allowed for retuning should be long enough that the UE will have time to decode the next U subframe on the primary carrier 702. This transition is shown by diagonal arrow 708. This sequence of transitions between the primary carrier 702 and the unprotected secondary carrier 704 repeats periodically.

FIG. 7 also shows an example of an HARQ timeline that can correspond to the disclosed frequency hopping scheme. Generally a UE generates one ACK or NACK bit (ACK/NACK) for each subframe where data has been received. In this example, the ACK/NACKs corresponding to the subframes where data has been received on the unprotected secondary carrier 704 are bundled or multiplexed and fed back using the same PUCCH resources on a protected uplink resource 714 of a protected uplink carrier 716. The ACK/NACK corresponding to the U subframe on the primary carrier 702 is also fed back using the same PUCCH resources on a protected uplink resource 714 but kept separate from the combined ACK/NACK of the secondary carrier. Illustratively, the protected uplink resource may be a time division partitioned subframe on the protected uplink carrier 716. Various previously known methods can be used for multiplexing or merging the ACK/NACKs.

In at least one example, a UE may report multiple channel quality indications (CQIs), to include one channel quality indication for each carrier being used. The UE may also report CQI for carriers not currently used. It is envisioned that an eNodeB may instruct a UE to generate a CQI for any number of particular carriers. A new periodic reporting mode may be defined, for example, in which a UE cycles through a set of carriers for each periodic reporting. In this example, the set of carriers may be provided to the UE by an eNodeB's upper layers.

If it becomes apparent that the unprotected secondary carrier is suffering interference, or is otherwise degraded or unusable, for example as may be indicated by a high number of NACKs, then transmissions on the secondary carrier can be discontinued. In this case, a new secondary carrier can be selected and a grant for resources on the new secondary carrier can be provided to the UE.

In another example, multicarrier operations are performed for downlink (DL) transmissions and also for uplink (UL) transmissions. Most of transmissions to the UE are carried out over an unprotected downlink carrier and most of the transmissions from the UE are carried out over an unprotected uplink carrier. The UE periodically retunes its receiver circuitry between the downlink primary carrier and the unprotected downlink secondary carrier. The UE also periodically retunes its transmitter circuitry between the uplink primary carrier and the unprotected uplink secondary carrier.

In this example, the UE receives a primary carrier uplink control information (UCI) grant and a secondary carrier UCI grant. Uplink control information provides a hybrid-ARQ protocol and a scheduler with information about the UE. An uplink grant may carry control information for data transmission on the uplink. The primary carrier UCI grant is for the U subframe on the primary carrier. The secondary carrier UCI grant is for particular subframes on the secondary carrier. In the various examples, the U subframes of an uplink primary carrier are offset from the U subframes of a downlink primary carrier by a fixed number of subframes.

Figure 8:
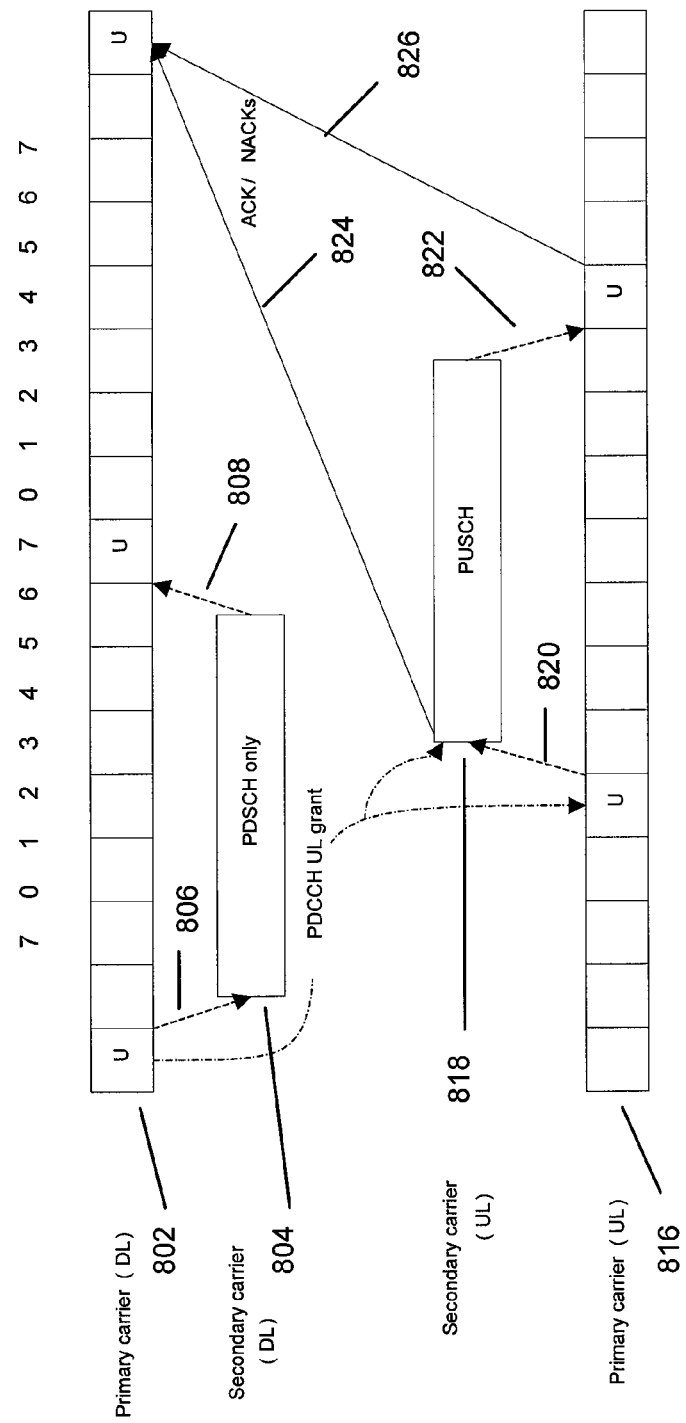
FIG. 8 is a diagram conceptually illustrating an example of a multicarrier frame structure according to an aspect of the disclosure.

Referring to FIG. 8, a diagram of a downlink primary carrier for a downlink transmission 802 is shown and a diagram of an unprotected downlink secondary carrier 804 is shown juxtaposed in time with the downlink primary carrier 802. UE receiver circuitry tunes to the downlink primary carrier 802 during the U subframe of the downlink primary carrier 802. The UE decodes the signal received on the U subframe. As soon as the UE has decoded the U subframe, the UE retunes its receiver to the unprotected downlink secondary carrier 804 as shown by diagonal arrow 806. After retuning to the unprotected downlink secondary carrier 804, the UE receives data on the unprotected downlink secondary carrier 804. After a time corresponding to a number of subframes between U subframes has passed minus enough time to complete a retuning operation, the UE retunes to the downlink primary carrier 802 as shown by diagonal arrow 808. This sequence of downlink transitions between the downlink primary carrier 802 and the unprotected downlink secondary carrier 804 repeats periodically.

The UE transmitter circuitry tunes to the uplink primary carrier 816 during a U subframe of the uplink primary carrier 816. The UE transmits a signal on the U subframe then retunes its transmitter circuitry to the unprotected uplink secondary carrier 818 as shown by diagonal arrow 820. After retuning to the unprotected uplink secondary carrier 818, the UE transmits data on the unprotected uplink secondary carrier 818. After a time corresponding to a number of subframes between U subframes has passed minus enough time to complete a retuning operation, the UE retunes its transmitter circuitry to the uplink primary carrier 816 as shown by diagonal arrow 822. This sequence of uplink transitions between the uplink primary carrier 816 and the unprotected uplink secondary carrier 818 repeats periodically.

ACK/NACKs corresponding to the subframes where data has been received by an eNodeB on the unprotected uplink secondary carrier 818 may be bundled or multiplexed and fed back to the UE in a U subframe of the downlink primary carrier 802 as shown by arrow 824. An ACK/NACK corresponding to the U subframe received by an eNodeB on the uplink primary carrier 816 may be kept separate from the combined ACK/NACK of the secondary carrier but may also be fed back to the UE in a U subframe of the downlink primary carrier 802 as shown by arrow 826.

Figure 9:
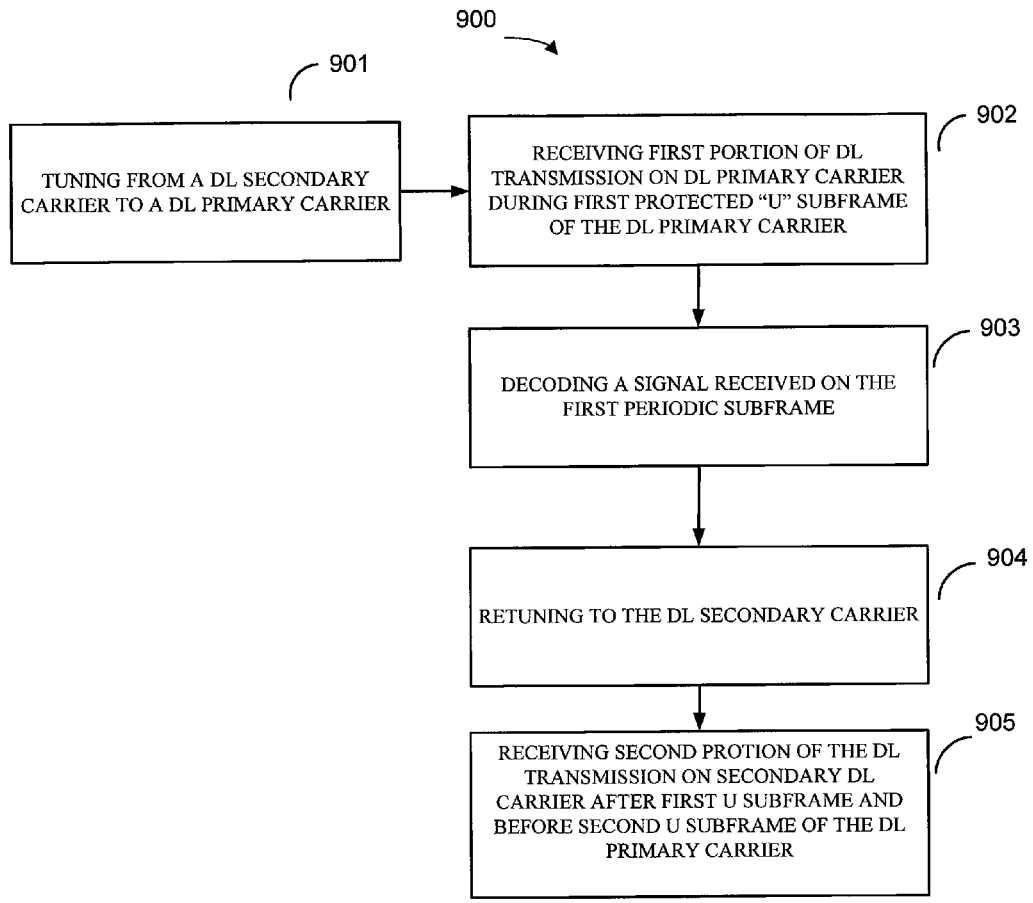
FIG. 9 is a block diagram illustrating a method for multi-carrier communication by a UE having a single receiver according to one aspect of the disclosure.

A method of wireless communication according to an example of the present disclosure is described with reference to FIG. 9. The method 900 includes tuning to a downlink primary carrier at block 901. Next at block 902, a single receiver of a user equipment (UE) receives a first portion of a downlink transmission from an eNode B (eNodeB) on the downlink primary carrier during a first periodic subframe of the downlink primary carrier. Next at block 903, decoding of a signal received on the first periodic subframe, which in one example is a U subframe, occurs. At block 904, the method retunes to a downlink secondary carrier, which in one example is an unprotected secondary carrier. The method then receives by the single receiver a second portion of the downlink transmission from the eNodeB on a secondary downlink carrier, at block 905. The reception occurs during a periodic sequence of subframes of the secondary downlink carrier following the first periodic subframe of the downlink primary carrier and before a second periodic subframe of the downlink primary carrier. The single receiver may then receive a third portion of the downlink transmission from the eNodeB on the downlink primary carrier during the second periodic subframe of the downlink primary carrier.

The method may also include transmitting by a single transmitter of the UE an uplink transmission to the eNodeB on an uplink primary carrier during a first periodic subframe of the uplink primary carrier. The single transmitter then transmits the uplink transmission to the eNodeB on a secondary uplink carrier during a periodic sequence of subframes of the secondary uplink carrier following the first periodic subframe of the uplink primary carrier and before a second periodic subframe of the uplink primary carrier. Then, the single transmitter transmits the uplink transmission to the eNodeB on the uplink primary carrier during the second periodic subframe of the uplink primary carrier.

Figure 10:
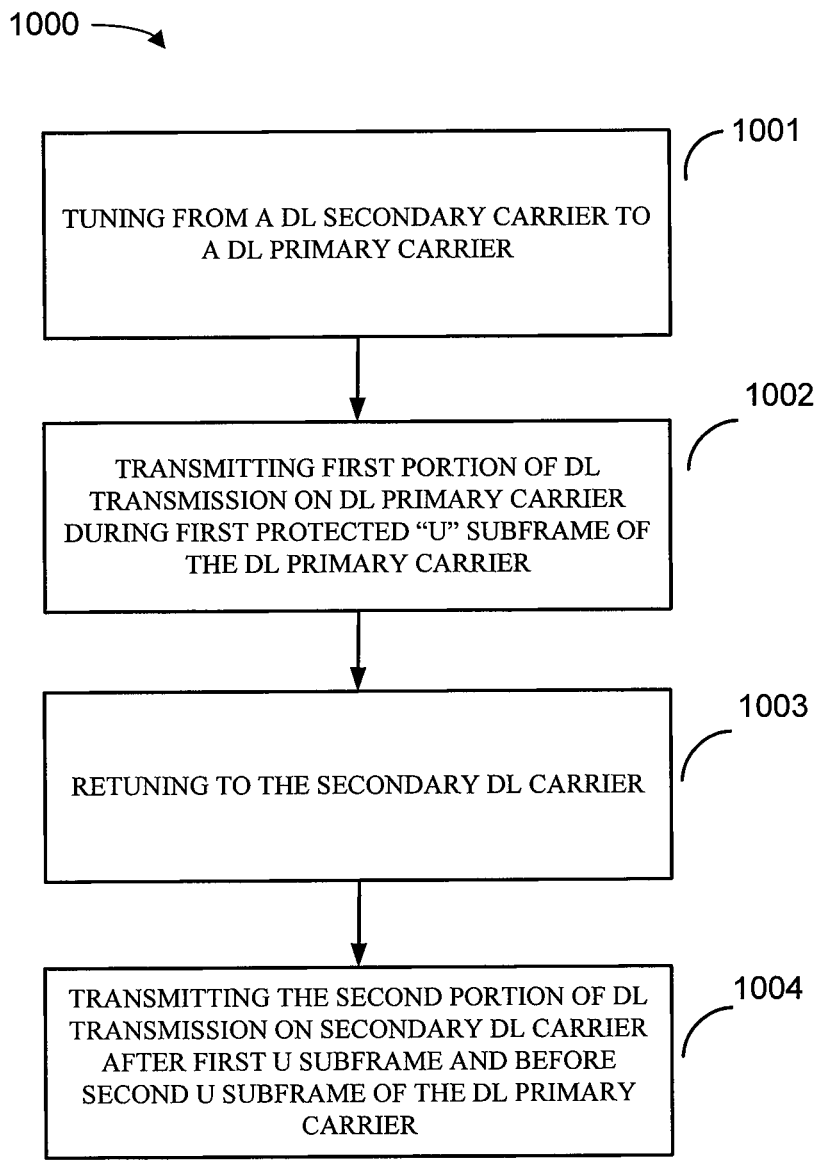
FIGS. 10-12 are block diagrams illustrating methods for multi-carrier communication with a UE having a single receiver according to one aspect of the disclosure.

A method of wireless communication according to another example of the present disclosure is described with reference to FIG. 10. The method 1000 includes tuning to a downlink primary carrier at block 1001. Next, at block 1002 transmitting to a single receiver of a user equipment (UE) a first portion of a downlink transmission by an eNode B (eNodeB) on the downlink primary carrier during a first periodic subframe of the downlink primary carrier occurs. At block 1003, retuning to a secondary downlink carrier occurs. The method then transmits (block 1004) to the single receiver a second portion of the downlink transmission by the eNodeB on a secondary downlink carrier. The transmission occurs during a periodic sequence of subframes of the secondary downlink carrier following the first periodic subframe of the downlink primary carrier and before a second periodic subframe of the downlink primary carrier. The eNodeB then transmits to the single receiver the downlink transmission on the downlink primary carrier during the second periodic subframe of the downlink primary carrier.

The method may also include receiving from a single transmitter of the UE an uplink transmission on an uplink primary carrier during a first periodic subframe of the uplink primary carrier. The eNodeB then receives from the single transmitter the uplink transmission on a secondary uplink carrier during a periodic sequence of subframes of the secondary uplink carrier following the first periodic subframe of the uplink primary carrier and before a second periodic subframe of the uplink primary carrier. The eNodeB then receives from the single transmitter the uplink transmission on the uplink primary carrier during the second periodic subframe of the uplink primary carrier.

Figure 11:
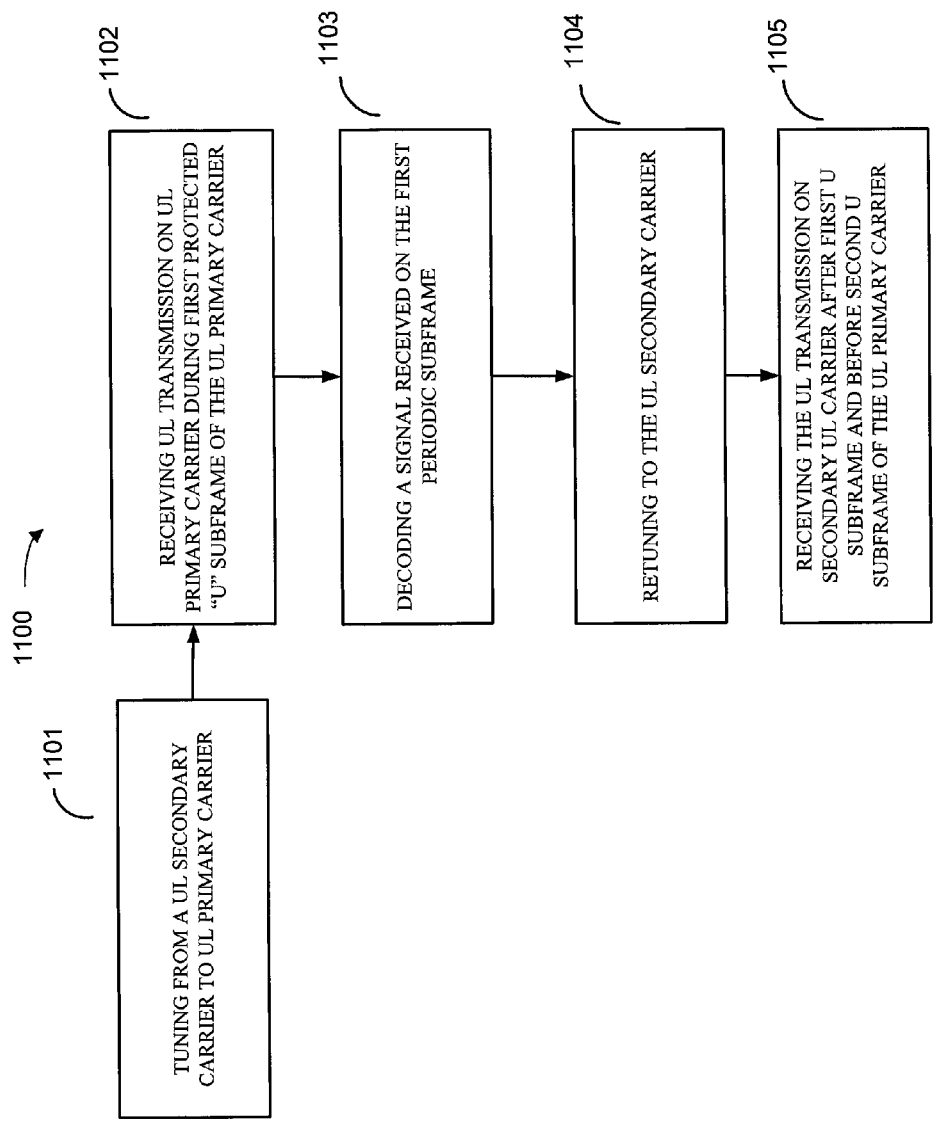

A method of wireless communication according to an example of the present disclosure is described with reference to FIG. 11. The method 1100 includes tuning to an uplink primary carrier at block 1101. Next at block 1102, the eNodeB receives an uplink transmission from a UE on an uplink primary carrier during a first periodic subframe of the uplink primary carrier. At block 1103, decoding a signal received on the first periodic subframe, which in one example is a U subframe, occurs. Next, at block 1104, retuning to an uplink secondary carrier, which in one example is an unprotected secondary carrier, occurs. The method then receives, at block 1105, the uplink transmission from the UE on a secondary downlink carrier during a periodic sequence of subframes of the secondary uplink carrier following the first periodic subframe of the uplink primary carrier and before a second periodic subframe of the uplink primary carrier. The eNodeB may then receive the uplink transmission on the uplink primary carrier during the second periodic subframe of the uplink primary carrier.

Figure 12:
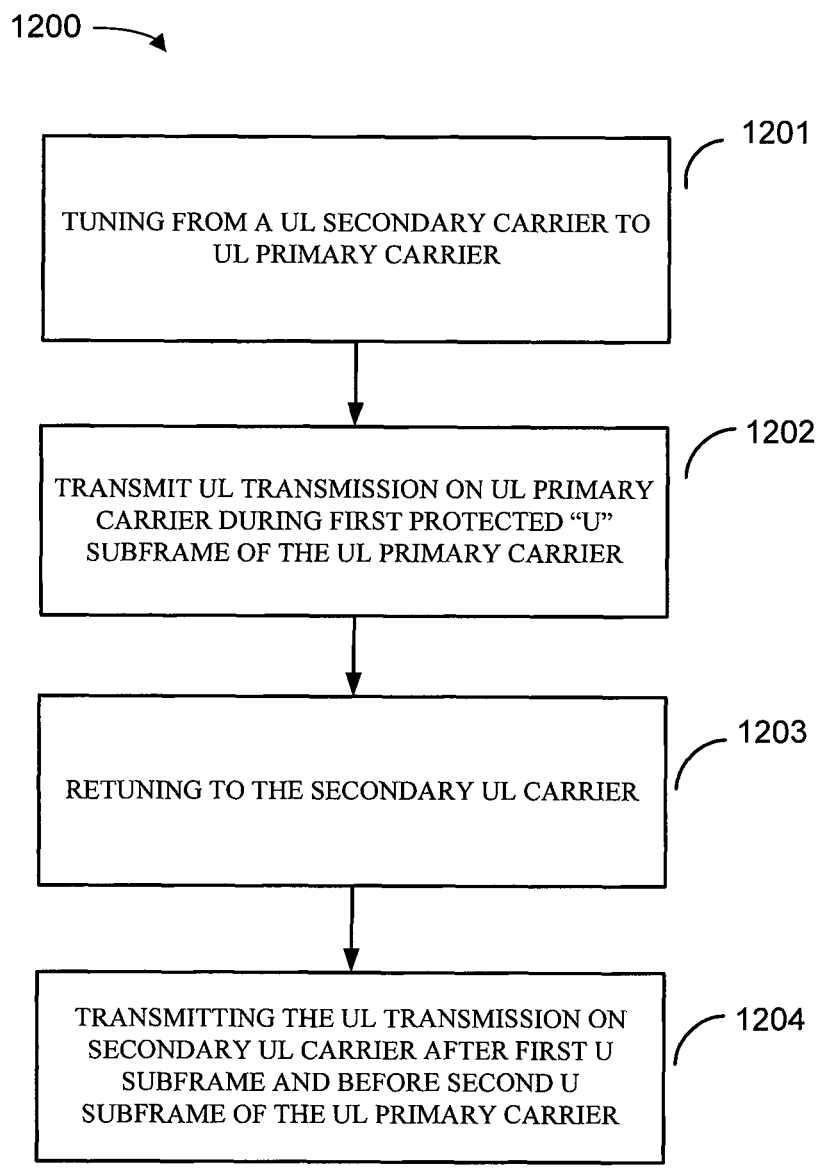

A method of wireless communication according to another example of the present disclosure is described with reference to FIG. 12. The method 1200 includes tuning to an uplink primary carrier at block 1201. Next, at block 1202 a UE transmits to an eNodeB an uplink transmission on the uplink primary carrier during a first periodic subframe of the uplink primary carrier. At block 1203, retuning to a secondary uplink carrier occurs. The method then transmits (at block 1204) to the eNodeB the uplink transmission on a secondary uplink carrier during a periodic sequence of subframes of the secondary uplink carrier following the first periodic subframe of the uplink primary carrier and before a second periodic subframe of the uplink primary carrier. The UE may then transmit to the eNodeB the uplink transmission on the uplink primary carrier during the second periodic subframe of the uplink primary carrier.

Although various examples disclosed herein include communication of data on an unprotected secondary channel and communication of control information on a protected resource of a primary channel, it should be understood that various alternative examples may also include communication of control information on secondary channels and/or communication of data on a protected resource of a primary channel.

In one configuration, the UE 120 is configured for wireless communication and includes receiving means. In various aspects, the aforementioned receiving means may be the antenna 352A-T, demodulator 354A-T, receive processor 358, controller processor 380, and/or memory 382 configured to perform the functions recited by the aforementioned means. In another aspect, the aforementioned means may be any module or any apparatus configured to perform the functions recited by the aforementioned means. In one configuration, the eNodeB 110 is configured for wireless communication and includes transmitting means configured to perform the functions recited by the aforementioned means. In various aspects, the aforementioned transmitting means may be the antenna 334A-T, modulator 332A-T, transmit processor 320, controller processor 340, and/or memory 342 configured to perform the functions recited by the aforementioned means. In another aspect, the aforementioned means may be any module or any apparatus configured to perform the functions recited by the aforementioned means.

Figure 13:
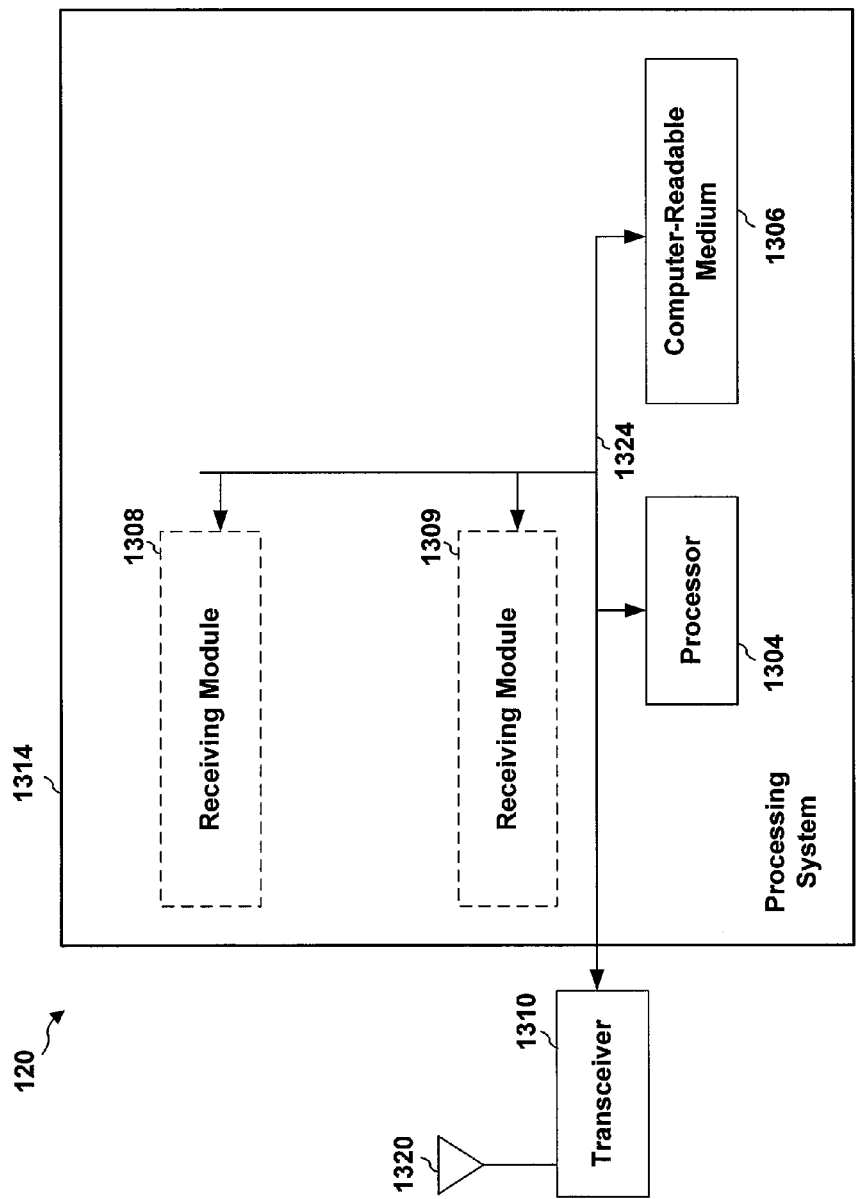
FIG. 13 is a block diagram illustrating an example of a hardware implementation for an apparatus employing a processing system.

FIG. 13 is a diagram illustrating an example of a hardware implementation for an apparatus 120 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1308, 1309 and the computer-readable medium 1306. The bus 1324 may also link various other circuits such as timing sources, peripherals, voltage regulators, and power management circuits, which are well known in the art, and therefore, will not be described any further.

The apparatus includes a processing system 1314 coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes receiving modules 1308, 1309. The modules may be software modules running in the processor 1304, resident/stored in the computer readable medium 1306, one or more hardware modules coupled to the processor 304, or some combination thereof. The processing system 1314 may be a component of the UE 120 and may include the memory 382 and/or at least one of the TX processor 364, the RX processor 358, and the controller/processor 380.

In one configuration, the apparatus 120 for wireless communication includes means for receiving. The aforementioned means may be one or more of the aforementioned modules of the apparatus 120 and/or the processing system 1314 of the apparatus 120 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    tuning a radio frequency (RF) receiver from a secondary downlink carrier to a downlink primary carrier before receiving a downlink transmission on the downlink primary carrier during a first protected subframe;
    receiving a first portion of the downlink transmission on the downlink primary carrier during at least one periodic subframe of the downlink primary carrier, wherein the at least one periodic subframe includes an indication of the secondary downlink carrier to be used for a next subframe;
    decoding a signal received on the downlink primary carrier;
    retuning the RF receiver to the secondary downlink carrier before receiving the downlink transmission on the secondary downlink carrier;
    receiving a second portion of the downlink transmission on the secondary downlink carrier during a periodic sequence of subframes of the secondary downlink carrier following the at least one periodic subframe of the downlink primary carrier and before a second periodic subframe of the downlink primary carrier, wherein the second portion of the downlink transmission comprises only Physical Downlink Shared Channel (PDSCH) data; and
    repeating the tuning, decoding, receiving on the primary and the secondary downlink carriers and retuning periodically.

2. The method of claim 1, further comprising:
    receiving a third portion of the downlink transmission on the downlink primary carrier during the second periodic subframe of the downlink primary carrier.

3. The method of claim 1, wherein:
    the first portion of the downlink transmission comprises control information.

4. The method of claim 3, wherein the control information comprises a primary carrier downlink control information (DCI) grant, and a secondary carrier downlink control information (DCI) grant.

5. The method of claim 1, wherein:
    the first portion of the downlink transmission received on the downlink primary carrier comprises control information for the downlink primary carrier.

6. The method of claim 1, further comprising transmitting uplink control information (UCI) on a primary uplink carrier.

7. The method of claim 1, further comprising transmitting uplink control information (UCI) on a primary uplink carrier for both the primary uplink carrier and a secondary uplink carrier.

8. An apparatus for wireless communication, comprising:
    a memory; and
    at least one processor coupled to the memory and configured:
        to tune a radio frequency (RF) receiver from a secondary downlink carrier to a downlink primary carrier before receiving a downlink transmission on the downlink primary carrier during a first protected subframe;
        to receive a first portion of the downlink transmission on the downlink primary carrier during at least one periodic subframe of the downlink primary carrier, wherein the at least one periodic subframe includes an indication of the secondary downlink carrier to be used for a next subframe;
        to decode a signal received on the downlink primary carrier;

to retune the RF receiver to the secondary downlink carrier before receiving the downlink transmission on the secondary downlink carrier;

to receive a second portion of the downlink transmission on the secondary downlink carrier during a periodic sequence of subframes of the secondary downlink carrier following the at least one periodic subframe of the downlink primary carrier and before a second periodic subframe of the downlink primary carrier, wherein the second portion of the downlink transmission comprises only Physical Downlink Shared Channel (PDSCH) data; and to repeat the tuning, decoding, receiving on the primary and the secondary downlink carriers and retuning periodically.

9. The apparatus of claim 8, in which the at least one processor is further configured to receive a third portion of the downlink transmission on the downlink primary carrier during the second periodic subframe of the downlink primary carrier.

10. The apparatus of claim 8, wherein:
the first portion of the downlink transmission comprises control information.

11. The apparatus of claim 10, wherein the control information comprises a primary carrier downlink control information (DCI) grant, and a secondary carrier downlink control information (DCI) grant.

12. The apparatus of claim 8, wherein:
the first portion of the downlink transmission received on the downlink primary carrier comprises control information for the downlink primary carrier.

13. The apparatus of claim 8, in which the at least one processor is further configured to transmit uplink control information (UCI) on a primary uplink carrier.

14. The apparatus of claim 8, in which the at least one processor is further configured to transmit uplink control information (UCI) on a primary uplink carrier for both the primary uplink carrier and a secondary uplink carrier.

15. A non-transitory computer-readable medium having program code recorded thereon, the program code comprising:

program code to tune a radio frequency (RF) receiver from a secondary downlink carrier to a downlink primary carrier before receiving a downlink transmission on the downlink primary carrier during a first protected subframe;

program code to receive a first portion of the downlink transmission on the downlink primary carrier during at least one periodic subframe of the downlink primary carrier, wherein the at least one periodic subframe includes an indication of the secondary downlink carrier to be used for a next subframe;

program code to decode a signal received on the downlink primary carrier;

program code to retune the RF receiver to the secondary downlink carrier before receiving the downlink transmission on the secondary downlink carrier;

program code to receive a second portion of the downlink transmission on the secondary downlink carrier during a periodic sequence of subframes of the secondary downlink carrier following the at least one periodic subframe of the downlink primary carrier and before a second periodic subframe of the downlink primary carrier, wherein the second portion of the downlink transmission comprises only Physical Downlink Shared Channel (PDSCH) data; and program code to repeat the tuning, decoding, receiving on the primary and the secondary downlink carriers and retuning periodically.

16. The non-transitory computer-readable medium of claim 15, further comprising program code to receive a third portion of the downlink transmission on the downlink primary carrier during the second periodic subframe of the downlink primary carrier.

17. An apparatus for wireless communication, comprising:
means for tuning a radio frequency (RF) receiver from a secondary downlink carrier to a downlink primary carrier before receiving a downlink transmission on the downlink primary carrier during a first protected subframe;

means for receiving a first portion of the downlink transmission on the downlink primary carrier during at least one periodic subframe of the downlink primary carrier, wherein the at least one periodic subframe includes an indication of the secondary downlink carrier to be used for a next subframe;

means for decoding a signal received on the downlink primary carrier;

means for retuning the RF receiver to the secondary downlink carrier before receiving the downlink transmission on the secondary downlink carrier;

means for receiving a second portion of the downlink transmission on the secondary downlink carrier during a periodic sequence of subframes of the secondary downlink carrier following the at least one periodic subframe of the downlink primary carrier and before a second periodic subframe of the downlink primary carrier, wherein the second portion of the downlink transmission comprises only Physical Downlink Shared Channel (PDSCH) data; and means for repeating the tuning, decoding, receiving on the primary and the secondary downlink carriers and retuning periodically.

18. The apparatus of claim 17, further comprising:
means for receiving a third portion of the downlink transmission on the downlink primary carrier during the second periodic subframe of the downlink primary carrier.

* * * * *